United States Patent [19]

Tavis

[11] Patent Number: 4,627,281
[45] Date of Patent: Dec. 9, 1986

[54] TANK GAGING SYSTEM

[75] Inventor: John A. Tavis, Mariposa, Calif.

[73] Assignee: Tavis Corporation, Mariposa, Calif.

[21] Appl. No.: 732,686

[22] Filed: May 10, 1985

[51] Int. Cl.[4] .................. G01F 23/16; G01F 23/18
[52] U.S. Cl. ......................................... 73/302; 73/301; 73/299
[58] Field of Search .................. 73/299, 300, 301, 302, 73/303

[56] References Cited

U.S. PATENT DOCUMENTS

| | | | |
|---|---|---|---|
| B 463,473 | 3/1976 | Borst | 73/302 |
| 1,586,200 | 5/1926 | Huffman | 73/302 |
| 1,871,182 | 8/1932 | King | 73/302 |
| 2,166,904 | 7/1939 | Gray | 73/299 |
| 2,559,436 | 7/1951 | Isserstedt | 73/301 |
| 3,023,619 | 3/1962 | Sandford | 73/299 |
| 3,054,292 | 9/1962 | Vandoni | 73/299 |
| 3,114,381 | 12/1963 | Klose et al. | 73/299 |
| 3,394,590 | 7/1968 | Napolitano | 73/299 |
| 3,538,746 | 11/1970 | Jacobs et al. | 73/49.2 |
| 3,729,997 | 5/1973 | Luke | 73/302 |
| 4,006,635 | 2/1977 | Khoi | 73/305 |
| 4,020,690 | 5/1977 | Samuels et al. | 73/299 |
| 4,091,669 | 5/1978 | Fehr et al. | 73/299 |
| 4,193,303 | 3/1980 | Egnell | 73/299 |
| 4,368,639 | 1/1983 | Owens | 73/301 |

Primary Examiner—Charles Frankfort
Assistant Examiner—Thomas B. Will
Attorney, Agent, or Firm—Christie, Parker & Hale

[57] ABSTRACT

A high-accuracy system for gaging liquid height in storage tanks. A pair of standpipes are arranged to be pumped to several accurately predetermined liquid levels to enable zero and sensitivity calibration of a differential-pressure transducer which normally monitors the pressure head of a column of liquid in the tank. The entire system is filled with tank liquid (eliminating condensation and vapor bubble problems encountered if the transducer is vented to atmosphere), and sharp-edged standpipes provided to minimize meniscus error when one or both standpipes are completely full.

8 Claims, 4 Drawing Figures

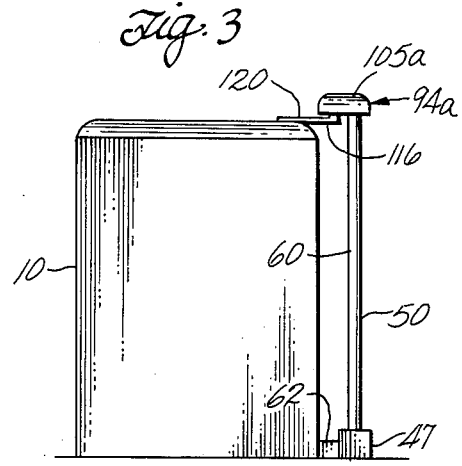
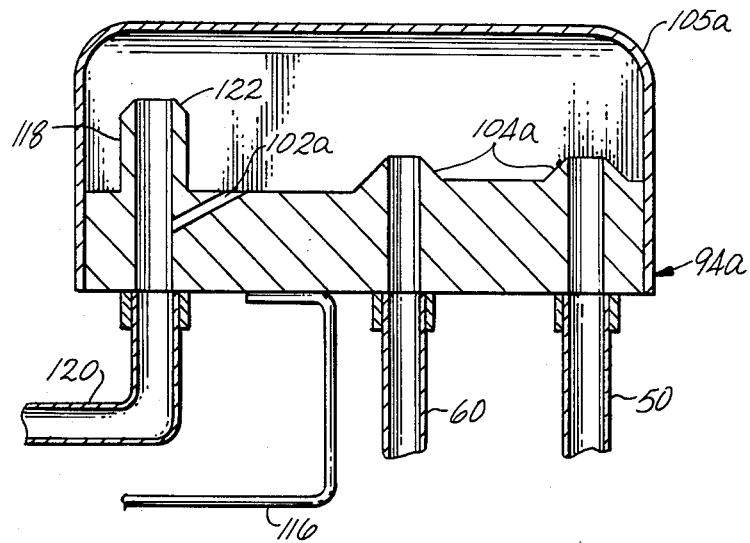

TANK GAGING SYSTEM

BACKGROUND OF THE INVENTION

High-accuracy measurement of the fluid level in liquid storage tanks is important for precise inventory control, and also due to growing concern over groundwater contamination that can occur with leakage from such tanks. This is especially true with underground liquid storage tanks (e.g., for gasoline and other petroleum products) because of their proximity to groundwater and the near impossibility of detecting leaks by external inspection. Accurate fluid level measurement, however, is an old problem which has been approached in many ways.

A conventional manual method would involve an operator lowering a weighted tape into the tank until the lower end reached the bottom of the tank so that a reading could be taken. This method is not very accurate or convenient, and can be dangerous if the liquid being measured emits noxious fumes. Simple external transparent tubes or sight gages, from which the liquid level can be visually inspected, can be used on above-ground tanks. Visual inspection, however, is inconvenient, can lead to inaccuracies, and is not well adapted for subsequent automatic processing of data.

The general unsuitability of manual measuring techniques led to the development of automatic liquid-level sensing devices. One category of automatic sensing device employs a float connected by an appropriate series of levers to a dial which provides a liquid-level reading. But floats tend to leak after a period of time, resulting in inaccurate measurements, and the mechanical levers are susceptible to maintenance problems. Sonar or photoelectric systems are another category of automatic sensing device. These systems require expensive and specially designed equipment necessitating maintenance and periodic replacement of parts. Their accuracy is also questionable because the presence of sludge, rust particles or other foreign matter suspended in the liquid will cause inaccurate readings.

Electrical pressure transducer systems are yet another category of automatic sensing device. A very simple transducer system would involve positioning the pressure transducer at the bottom of the tank, and then measuring the pressure exerted on the transducer diaphragm by the column of fluid in the tank above the transducer. This simple system would work well, but for the tendency of transducers to have zero drift (drift in the output signal when no pressure is applied), and sensitivity drift (long-term variations in the output signal when the pressure input is constant). To maintain a high level of accuracy, the submerged transducer must be periodically subjected to zero and sensitivity drift checks.

One approach to providing these periodic checks which has been suggested is depicted in FIG. 2. In this approach, the transducer system is designed to operate in three separate modes. In the measurement mode, one side of the transducer is exposed to atmospheric pressure while the other side is exposed to the pressure developed by the height of the liquid in the tank. In the zero-drift check mode, both sides of the transducer are exposed to atmospheric pressure. In the sensitivity drift-check mode, one side of the transducer is exposed to atmospheric pressure while the other side is exposed to the pressure developed by the height of a column of liquid in a reference standpipe. The reference column of liquid is generated by pumping the standpipe full of liquid from the tank until it overflows and has a height corresponding approximately to the level of liquid in the tank when it is full. While this approach (using a differential pressure transducer in a gage-pressure mode) solves the problem of providing periodic checks on the accuracy of the transducer, it introduces difficulties which could affect the accuracy of the level measurement.

Atmospheric moisture will tend to condense in the vent line which supplies atmospheric pressure to the transducer. A small amount of condensed water in this line will degrade the accuracy of the pressure on the reference side of the transducer during measurement and in the sensitivity and zero-drift check modes. Also, in shifting between the different modes, there will be a tendency for air to get trapped on the liquid side of the transducer and for liquid to get trapped on the air side of the transducer. Either condition will throw off the pressure readings and degrade the accuracy of the system. Finally, a meniscus will tend to form at the upper end of the standpipe. Because the height of the meniscus is not especially repeatable, the accuracy of the system will be adversely affected by changes in the height of the reference column of liquid for successive sensitivity drift checks.

Accordingly, a need exists for an automatic high-precision liquid-level sensing system where periodic checks can be made for zero drift and sensitivity drift to maintain the accuracy of the electrical pressure transducer, and without introducing other factors adversely affecting accuracy of the system.

SUMMARY OF THE INVENTION

This invention is directed to a system for making highly accurate measurements of liquid level in a storage tank. The system uses a pair of standpipes positioned in the tank, and connected to a bidirectional pump through a network of remote-control valves which enable the standpipes to be filled with tank liquid to predetermined, accurately established liquid levels. A differential-pressure transducer is connected to the tank and to the several standpipes through the valve network to provide measurement of tank level in one mode, and to permit periodic zero and sensitivity calibration in other modes. The resulting elimination of transducer drift errors in both zero and sensitivity provides tank level measurements to a degree of precision which enables not only accurate inventory control of tank contents, but also detection of minute leaks which can cause pollution and other problems.

In a preferred operating mode, the two standpipes are filled with tank liquid to identical levels, and the differential-pressure transducer is connected between the lower ends of the standpipes to be exposed to identical pressures and therefore zero differential pressure. Any transducer output signal is then noted to establish a zero reference reading. The liquid levels are then adjusted to be unequal in the standpipes by an accurately known amount, and the resulting differential pressure head enables sensitivity calibration of the transducer. For normal level measurements, the reference side of the transducer is connected to a standpipe at a zero reference level, and the opposite side of the transducer is exposed to liquid pressure at the bottom of the tank.

The calibration steps may be done in any desired order, and under the control of a conventional programmed automatic stepping controller. A particular feature of the invention is minimization of meniscus error by reducing the cross section of the cylindrical standpipe upper ends to a sharp or pointed edge. A drainage cup is also provided at the upper end of each standpipe to enable standpipe overfilling, followed by a slow nonturbulent and repeatable reduction in liquid level to the exact level of the standpipe upper end. Importantly, the entire plumbing system is completely liquid filled, and measurement accuracy is further increased by using the tank liquid (rather than some other fluid) throughout the measurement and calibration modes.

BRIEF DESCRIPTION OF THE DRAWINGS

FIG. 3 is a schematic elevation of an alternate embodiment of the tank gaging system according to the present invention; and FIG. 4 is a sectional side view of a portion of the alternate embodiment of the tank gaging system according to the present invention.

DESCRIPTION OF THE PREFERRED EMBODIMENT

Figure 2:
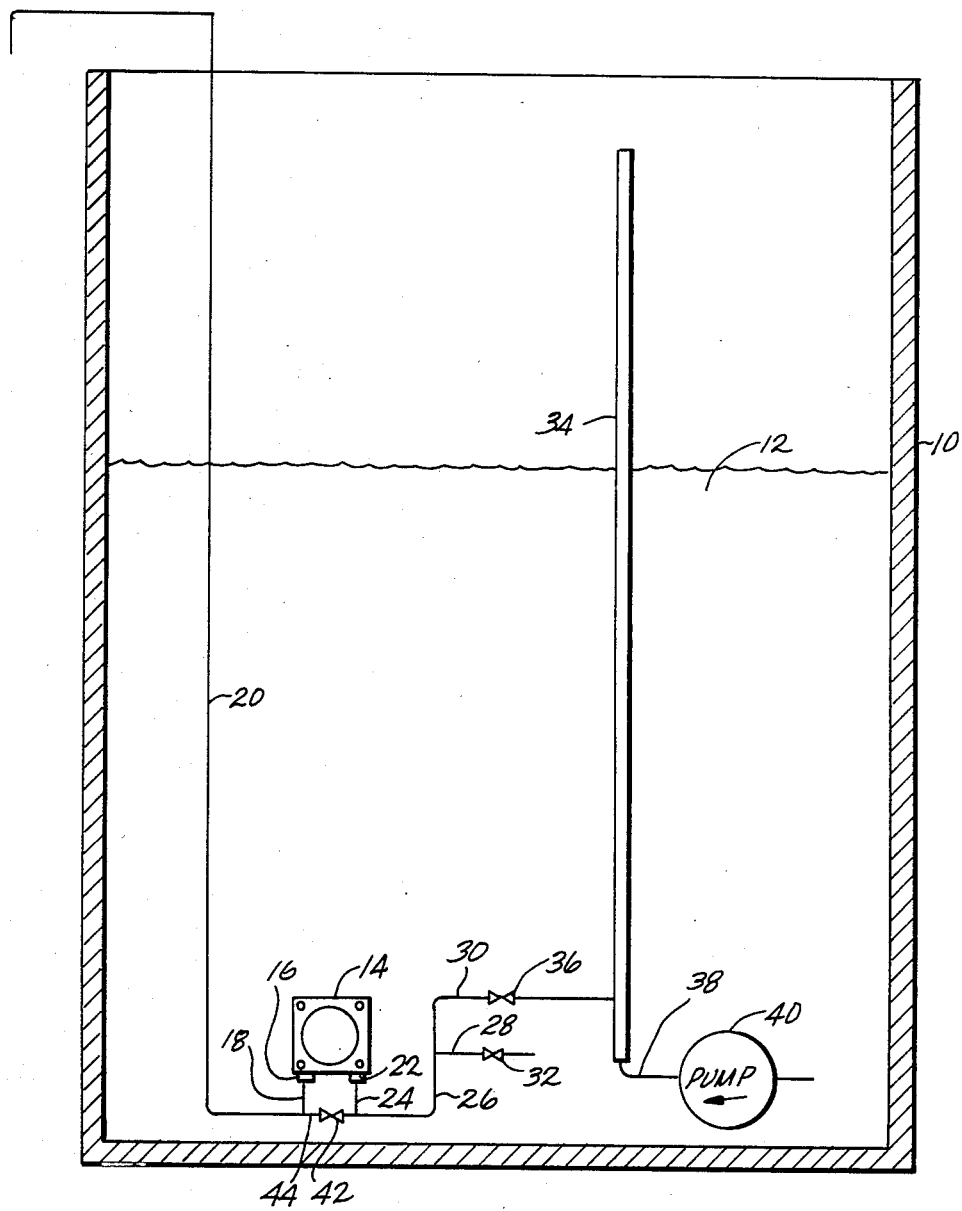
FIG. 2 is a schematic elevation of a prior-art tank gaging system using an electrical pressure transducer.

FIG. 2 shows a prior-art system for providing periodic zero and sensitivity calibration to maintain the accuracy of an electrical pressure transducer used to measure liquid level in a storage tank. A tank 10 containing a liquid 12 has an electrical pressure transducer 14 located at the bottom of the tank submerged in the liquid. Low pressure (reference) input 16 on transducer 14 is in fluid communication, through connecting line 18, with vent line 20 which is vented to atmosphere. High pressure input 22 on transducer 14 is in fluid communication, through connecting lines 24 and 26, with measurement line 28 and fill level reference line 30. Measurement line 28 can be opened to the liquid in the tank when desired by opening a valve 32 in the line. Fill level reference line 30 is connected to the lower end of a generally vertical standpipe 34. A valve 36 in line 30 can be opened to place the standpipe in fluid communication with transducer 14. Also connected to the lower end of standpipe 34 is a supply line 38 through which a pump 40, submerged in the liquid and positioned at the bottom of the tank, can supply liquid from the tank to the standpipe.

The prior-art system depicted in FIG. 2 is capable of making zero and sensitivity drift checks prior to making each measurement. To accomplish the zero drift check, a valve 42 in a bypass line 44 is opened while valves 32 and 36 are closed so that the atmospheric pressure supplied by vent line 20 is exposed to both inputs of the transducer at the same time. This allows a calibration reading to be taken on the signal from the transducer when the differential pressure it sees is (or should be) zero.

To accomplish the sensitivity drift check, valve 42 is closed, valve 36 is opened, valve 32 remains closed and pump 40 is turned on to supply liquid to standpipe 34. Pump 40 remains on until the standpipe is filled to overflowing and then is shut off. In this configuration, the low pressure input to transducer 14 is exposed to atmospheric pressure through vent line 20, while the high pressure input is exposed to the pressure exerted by the column of liquid in the standpipe. This allows a calibration reading to be taken on the signal from the transducer when the differential pressure it sees should be equal to that recorded when the tank was full.

As mentioned above, this prior art system can potentially suffer from inaccuracies caused by the formation of condensation in vent line 20 and the meniscus which will form at the top of standpipe 34. It should also now be clear that when valve 42 is opened during the zero-drift check, the possibility is created for getting air on what is normally the liquid side of the transducer and vice versa.

Figure 1:
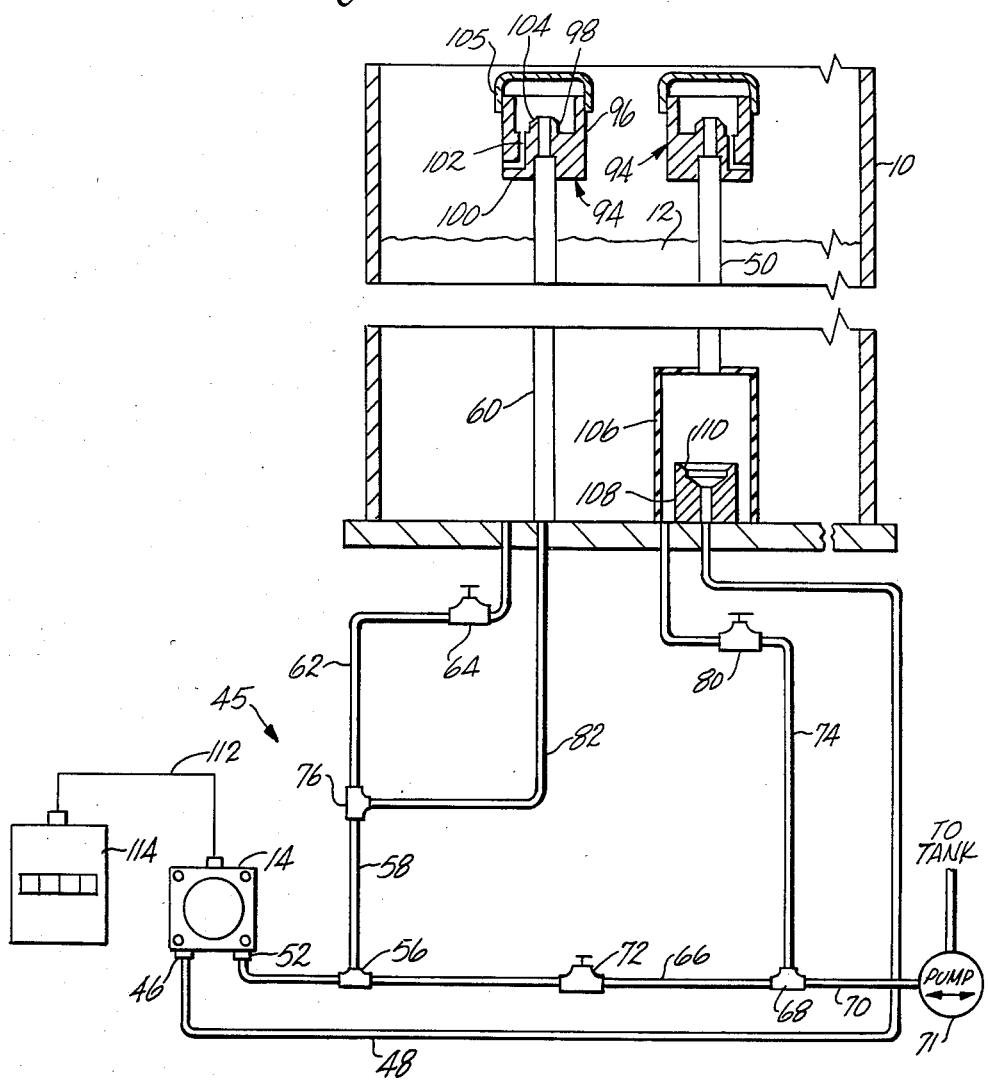
FIG. 1 is a schematic elevation of a tank gaging system according to the present invention.

With reference to FIG. 1, an improved level measuring system 45 is depicted in schematic form. For convenience of illustration, transducer 14 (a variable reluctance pressure transducer is preferred because they are especially suited to applications where both sides of the transducer are exposed to liquid) and its associated conduits or lines are shown below the floor of tank 10, but they preferably are physically positioned at the bottom of tank 10 submerged in liquid 12. In this instance, the transducer and its associated lines and electronics can be built into a completely sealed enclosure. This protects the functional parts of the instrument from the liquid in the tank and eliminates sources of ignition if the liquid were flammable. Alternatively, the instrument could be mounted on the outside of the tank near the bottom. This alternate embodiment is depicted in FIG. 3, where the transducer and its associated lines and electronics are mounted inside a sealed enclosure 47.

Low pressure input 46 on transducer 14 is in fluid communication, through connecting line 48, with the lower end of a generally vertical reference standpipe 50. High pressure input 52 on transducer 14 is in fluid communication, through connecting line 54, tee 56, connecting line 58, tee 76, and connecting line 82, with a generally vertical measuring standpipe 60.

The remaining branch of tee 76 is in fluid communication with the liquid in the tank through connecting line 62. A valve 64 in connecting line 62 provides control over the flow of liquid in the line. The remaining branch of tee 56 is in fluid communication, through connecting line 66, tee 68 and supply line 70, with a bi-directional pump 71. The bi-directional pump is also located at the bottom of the tank submerged in liquid 12. It also can be built into the completely sealed enclosure with the transducer or mounted on the outside of the tank (FIG. 3). A valve 72 in connecting line 66 provides control over the flow of liquid to or from the pump through the line.

The third branch of tee 68 is in fluid communication, through connecting line 74 with the lower end of standpipe 50. A valve 80 in connecting line 74 provides control over the flow of liquid to or from the pump through this line.

The above-described arrangement of lines and valves allows the transducer to be checked for zero drift and sensitivity drift before each level measurement without introducing the problems discussed in connection with the prior-art system shown in FIG. 2. To check for zero drift, valves 64 and 80 are closed and valve 72 opened; the bi-directional pump is turned on; and standpipe 60 is pumped full to overflowing with tank liquid through supply line 70, tee 68, connecting line 66, tee 56, connecting line 58, tee 76 and connecting line 82.

Once standpipe 60 is full, valve 72 is closed and valve 80 opened while valve 64 remains closed so that standpipe 50 can be filled to overflowing with tank liquid through supply line 70, tee 68 and connecting line 74. When standpipe 50 is full, valve 80 is closed and the pump turned off. Because standpipes 50 and 60 fill to the same height, both inputs to the differential-pressure transducer are exposed to the same pressure and a zero calibration can be made. The high pressure input is exposed to the pressure exerted by the liquid column in standpipe 60 through connecting line 54, tee 56 and connecting line 58, tee 76 and connecting line 82. The low pressure input is exposed to the same pressure as exerted by the liquid column in standpipe 50 through connecting line 48.

Standpipes 50 and 60 preferably have a one-half inch inner diameter. This size was found to represent an optimum compromise between smaller diameter standpipes where bubbles trapped during filling degrade measurement accuracy, and larger diameter standpipes that take too long to fill.

To eliminate problems with meniscus formation at the top of the standpipes, each standpipe is provided with an overflow cap 94. Cap 94 has an external hollow cylindrical portion 96 which is open at the top of an internal annularly spaced hollow cylindrical portion 98 which is open at the top and snugly connected at the bottom to the top end of the standpipe. The external and internal portions are connected to one another at their bottom edges by a floor piece 100. A drainage way 102 is provided in piece 100 to allow the drainage of liquid from the annular space formed between the external and internal portions of cap 94.

The upper edge of external portion 96 is above the upper edge 104 of internal portion 98 so that when a standpipe is filled initially it will overflow the external portion and then, once the pump is turned off, the liquid will drain more slowly from the annular space through drainage way 102 to leave the top of the liquid column at the top edge of internal portion 98. The meniscus is reduced at this internal top edge because the top edge is brought to a sharp point, and also due to the gentle establishment of final liquid-column height provided by drainage way 102. This is accomplished by making upper edge 104 angle downward as it proceeds from the inner wall to the outer wall of internal portion 98 as shown in the drawings, but other angulations may be used to achieve the desired sharp upper termination of the standpipe.

If tank 10 is open at the top, it is desirable to provide each cap 94 with a cover 105 to prevent exposure to the elements. If tank 10 is closed at the top, the covers are not necessary but may be desired to aid in the filling of both standpipes for a zero drift check at the same time. To save time, both standpipes may be filled simultaneously, rather than sequentially as described earlier, by opening valves 72 and 80 and keeping valve 64 closed while the pump is on fill.

If this is done, however, one standpipe may fill more quickly than the other due to less resistance in the lines connecting it with the pump. With cover 105 in place, when one standpipe is full the liquid will only be able to escape through the narrow drainage way so that the resistance to further liquid flow will be great. Therefore, the liquid will quickly fill up the remaining standpipe.

An alternate overflow cap embodiment 94a is shown in FIG. 4. While it is shown in particular with the externally mounted embodiment of FIG. 3, it should be understood that it could be adapted for use with the FIG. 1 embodiment. The alternate overflow cap is in many respects similar to the previously described embodiment except that it encompasses both standpipes. Those elements in common with the previously described embodiment are marked with the same number followed by an "a" and will not be described in detail a second time.

Overflow cap 94a is mounted on the roof of the tank by a bracket 116. In addition to the drainage way a bulk overflow exit 118 is provided to carry excess liquid back to the tank. Both the drainage way and the overflow exit communicate with a return pipe 120, which takes the excess liquid back to the top of the tank. The upper edge 122 of overflow exit 118 is above the upper edges 104a so that gentle drainage through drainage way 102a still establishes the final liquid-column height in the standpipes.

To check for sensitivity drift, valve 80 is opened while valves 64 and 72 remain closed and the pump is turned on in reverse to drain the liquid from standpipe 50 through connecting line 74, tee 68 and supply line 70. At the lower end of standpipe 50 is an expanded chamber 106 which has annularly spaced inside and at the bottom of it a lower overflow cup 108. Cup 108 is hollow, generally cylindrical and designed to have a sharp top edge 110 similar to the internal portions of overflow caps 94.

The drainage of liquid from standpipe 50 by the pump occurs from the bottom of the annular space formed between chamber 106 and cup 108 so that liquid will remain in cup 108 when the standpipe is drained. A conventional level switch (not shown) is provided below the top edge of cup 108 in chamber 106 to signal the pump to stop and valve 80 to close once standpipe 50 has been emptied.

The top edge of cup 108 is positioned to coincide with the lowest level of liquid in the tank. The low pressure input of transducer 14 is then exposed, through connecting line 48 which is in fluid communication with the liquid in cup 108, to a low pressure (empty tank) reading. The high pressure input of transducer 14 by a path already set out is exposed to the pressure exerted by standpipe 60. Standpipe 60 produces a liquid column equal in height to that of standpipe 50 when full, and also roughly equal in height to the full-tank liquid level in the tank. As a practical matter, the full level of the standpipes must be slightly above the full-tank liquid level to allow drainage from the overflow caps. It is, however, simple to make a mathematical correction to account for this fact and sensitivity drift should be the same for transducer readings in the same range. In this configuration, then, the transducer is exposed to a maximum pressure differential which should be the same as that measured when the tank was full, thus enabling a sensitivity calibration.

To make a level measurement, valve 64 is opened while valves 72 and 80 remain closed. This allows the height of liquid in standpipe 60 to equalize with that in the tank through connecting line 82, tee 76 and connecting line 62. In this configuration, transducer 14 is comparing the pressure exerted by the height of liquid in the tank with the low level reference pressure exerted by the liquid in cup 108. A level measurement can then be made based on the transducer output signal sent along a wire 112 to a digital voltmeter and power supply 114 located outside of the tank.

A summary of the steps taken during the zero and sensitivity drift checks and measurement along with corresponding valve positions and pump operation is provided in Table I.

TABLE I

| STEP | ACTION | VALVE 64 | VALVE 72 | VALVE 80 | PUMP |
|---|---|---|---|---|---|
| 1 | Filling Standpipe 60 | Closed | Open | Closed | On/Filling |
| 2 | Filling Standpipe 50 | Closed | Closed | Open | On/Filling |
| 3 | Zero Drift Check | Closed | Closed | Closed | Off |
| 4 | Draining Standpipe 50 | Closed | Closed | Open | On/Draining |
| 5 | Sensitivity Drift Check | Closed | Closed | Closed | Off |
| 6 | Measuring | Open | Closed | Closed | Off |

As previously discussed, the level measuring system of this invention eliminates problems caused by meniscus formation. In addition, because both sides of the transducer are always exposed to liquid, intermixing of air and liquid cannot occur and condensation in a vent line cannot occur. Thus the system of the present invention allows the accuracy of the transducer to be maintained through zero and sensitivity drift checks without introducing other potential sources of inaccuracy.

The valves used in the system are preferably of a conventional explosion-proof electrically actuated type, thus enabling the system to be stepped automatically through its various operating modes by a programmed timer. Digitizing of the transducer signals during both calibration and level measurements further permits full automation of the system for use without operator attention, with automatic standardization of transducer signals responsive to the calibration steps, and convenient digital storage and readout of the tank-level measurements. The resulting high-accuracy level measurements provide a needed improvement in measurement accuracy of liquid inventories, and make possible the sensing of small liquid losses due to leaks which are undetectable by gaging systems presently in use.

What is claimed is:

1. An apparatus for measuring the level of a liquid in a tank, comprising:
   a differential pressure transducer;
   a first standpipe adapted to be filled with the liquid to a high level reference height in a first mode and to be placed in fluid communication with the liquid in the tank such that the liquid level in the standpipe will be the same as that in the tank in a second mode;
   a second standpipe adapted to be filled with the liquid to the high level reference height in a first mode and to be drained of the liquid to a low level reference height in a second mode;
   means allowing the transducer to compare, at different selected times, the pressure exerted by the liquid in the first standpipe in the first mode with the pressure exerted by the liquid in the second standpipe in the first mode for zero-drift check, the pressure exerted by the liquid in the first standpipe in the first mode with the pressure exerted by the liquid in the second standpipe in the second mode for sensitivity drift check, and the pressure exerted by the liquid in the first standpipe in the second mode with the pressure exerted by the liquid in the second standpipe in the second mode for measuring an output representative of the liquid level in the tank; and
   means for selectively filling and draining the standpipes to achieve the several modes.

2. An apparatus as described in claim 1 where the high level reference height is set by the top edges of the standpipes where they overflow when filled.

3. An apparatus as described in claim 2 wherein the standpipes have upper ends terminating in sharp edges for meniscus control.

4. An apparatus as described in claim 3 wherein each standpipe further includes:
   a hollow generally cylindrical overflow cap positioned on and annularly spaced about the upper end of the standpipe;
   a floor piece attached to the outer surface of the standpipe below the upper end of the standpipe and connected to the lower end of the overflow cap; and
   a drainage way in the floor piece allowing liquid collected in the annular space between the cap and the standpipe to drain.

5. A method for measuring the level of a liquid in a tank, comprising the steps of:
   exposing the inputs of a differential pressure transducer to two columns of the liquid at a set reference height to obtain a zero-drift check;
   exposing the inputs of the differential pressure transducer to one column of the liquid at the set reference height and another column of the liquid at a second different set reference height to obtain a sensitivity drift check; and
   exposing the inputs of the differential pressure transducer to the liquid in the tank and a column of liquid at one of the set reference heights to obtain an output representative of the liquid level in the tank.

6. An apparatus for measuring the level of a liquid in a tank and for performing zero and sensitivity drift checks on a differential pressure transducer, comprising:
   a differential pressure transducer having first and second pressure ports;
   a first standpipe adapted to be filled with the liquid to a high level reference height for a first mode;
   means allowing the first standpipe to be selectively placed in fluid communication with the liquid in the tank such that the liquid level in the standpipe will be the same as that in the tank for a second mode so that the level of the liquid may be measured;
   a second standpipe adapted to be filled with the liquid to the high level reference height in a first mode and to be drained of the liquid to a low level reference height in a second mode;
   a conduit connecting the first port of the differential pressure transducer with the first standpipe to enable sensing of the standpipe liquid pressure in the first and second modes;
   a conduit connecting the second port of the differential pressure transducer with the second standpipe to enable sensing of the standpipe liquid pressure in the first and second modes;
   means for selectively filling the first standpipe to achieve its first mode and for selectively filling and draining the second standpipe to achieve its first and second modes so that zero and sensitivity drift checks on said differential pressure transducer may be performed.

7. An apparatus as described in claim 6 where the means allowing the first standpipe to be selectively placed in fluid communication with the liquid in the tank is a conduit connecting the tank and the lower end of the first standpipe, the conduit including a valve adapted to be selectively opened for allowing the liquid to move through the conduit or closed so that the liquid cannot move through the conduit.

8. An apparatus as described in claim 6 where the means for selectively filling the first standpipe and for selectively filling and draining the second standpipe is a bi-directional pump adapted to receive the liquid from the tank and supply it selectively to the first standpipe through a first conduit connecting the pump outlet and the lower end of the first standpipe having positioned along its length a valve that can be opened to permit liquid flow through the first conduit or closed to block liquid flow through the first conduit, and to the second standpipe, through a second conduit connecting the pump outlet and the lower end of the second standpipe having positioned along its length a valve that can be opened to permit liquid flow through the second conduit, and adapted to receive the liquid from the second standpipe and supply it to the tank through the second conduit.

* * * * *